United States Patent [19]

McKinley et al.

[11] Patent Number: 4,526,240

[45] Date of Patent: Jul. 2, 1985

[54] METHOD OF INHIBITING LOST CIRCULATION FROM A WELLBORE

[75] Inventors: Mark J. McKinley, Linwood; Douglas D. Applegath, Midland, both of Mich.

[73] Assignee: The Dow Chemical Company, Midland, Mich.

[21] Appl. No.: 542,872

[22] Filed: Oct. 17, 1983

[51] Int. Cl.³ .............................................. E21B 33/13
[52] U.S. Cl. ...................................... 175/72; 166/292; 166/293
[58] Field of Search .................. 175/72; 166/276, 282, 166/292, 293, 294, 295

[56] References Cited

U.S. PATENT DOCUMENTS

| | | | |
|---|---|---|---|
| 2,846,390 | 8/1958 | Lummus et al. | 175/72 |
| 3,316,965 | 5/1967 | Watanabe | 175/72 |
| 3,353,601 | 11/1967 | Dollarhide et al. | 175/72 |
| 3,448,800 | 6/1969 | Parker et al. | 175/72 |

FOREIGN PATENT DOCUMENTS 715900  8/1965  Canada ................................. 175/72

Primary Examiner—Stephen J. Novosad
Assistant Examiner—William P. Neuder

[57] ABSTRACT

A fibrous mass or fluff comprising a fibrous absorbent and a water-swellable hydrophilic polymer absorbent is injected into a borehole during well drilling process. The fibrous mass or fluff forms an essentially fluid-tight plug when wetted with water and acts to reduce drilling fluid loss via penetration of porous subterranean structure or formation openings.

4 Claims, No Drawings

METHOD OF INHIBITING LOST CIRCULATION FROM A WELLBORE

BACKGROUND OF THE INVENTION

This invention relates to a method for the production of hydrocarbon materials such as oil and natural gas by the recovery of such hydrocarbon materials from subterranean oil bearing reservoirs.

When a well is drilled into a geologic formation by the conventional procedure of making hole therethrough employing a fluid which is circulated down the hole and back up to ground level, delays and additional costs are sometimes experienced because the wellbore penetrates or makes communication with a void, such as a cavity or passageways in the formation. Such occurrence generally results in a situation known as lost circulation. The term is based upon the accompanying loss of drilling fluid from the wellbore into the void to such extent that a loss of fluid impedes progess, requires the use of large amounts of emplacement fluid, and sometimes is so pronounced that the drill becomes stuck in the hole which results in down time and unscheduled expense.

Lost circulation, obviously, is a condition to be prevented or at least corrected when it exists, as expeditiously as possible. Many different approaches to solving the problem of lost circulation have been made. Some success has been derived by emplacing one or more of a variety of materials into the void or at least into the opening leading thereto. Among such materials are shredded or fragmented scrap articles including automobile tires, burlap and other fabrics, and particularly rubberized fabrics, paper, cellulosic materials, and sometimes such mineral materials as hydraulic cements, glass, and sand which are carried in an aqueous slurry, often in admixture with some of the scrap materials set forth above. Unfortunately, the success of such various blends of loss circulation materials is provided on a trial and error basis. In the more serious cases, lost circulation has continued to plague the drilling of each well being drilled in those types of formation where such voids occur frequently.

In view of the deficiencies of the prior art, it would be highly desirable to provide an effective and efficient method of sealing fractures, fissures or cavernous openings encountered during the course of drilling a well in order that there be a relatively good circulation of drilling fluid.

SUMMARY OF THE INVENTION

The present invention is an improved well drilling method wherein a drilling fluid is injected into a borehole in the earth during the drilling of a borehole. The improvement comprises injecting as a drilling fluid a fluid medium comprising an absorbent fibrous mass comprising a fibrous absorbent and a water-swellable hydrophilic polymer absorbent, which fibrous mass is employed in an amount sufficient to reduce loss of the drilling fluid from the wellbore via formation openings proximate to the wellbore; wherein the absorbent fibrous mass, when wetted with water, forms an essentially fluid-tight plug in said openings. The fluid medium comprising said absorbent fibrous mass can also contain conventional lost circulation materials such as the many granular, fibrous and/or flaky materials known in the art.

The improved method of the present invention can be employed in enhanced oil recovery operations. Most advantageously, this method is employed in exploratory drilling applications. In particular, the present invention is employed during drilling operations in order to prevent lost circulation fluids into voids adjacent to or penetrated by the wellbore being drilled. That is, the composite fibrous material is believed to effectively plug fractures, fissures or cavernous openings thereby restoring the circulation of drilling mud during the process of drilling a well.

DETAILED DESCRIPTION OF THE INVENTION

For the purposes of this invention the following terms have been given the prescribed meaning. As used herein the term, "absorbent fibrous mass" refers to hydrophilic absorbent composites which are disclosed hereinafter which are of a size and consistency suitable for use in this invention. For example, the absorbent fibrous mass comprises particles of composites which can be introduced into a wellbone via conventional techniques. That is, the absorbent fibrous mass can comprise particles of the composite material which are of the size of previously employed shredded, flaked or fragmented lost circulation materials. Most preferably the absorbent fibrous mass is an absorbent fibrous fluff. By "fluff" is meant a matrix of discontinuous wicking fibers having a plurality of zones wherein the absence of fibrous matter imports air pockets with varying degrees of uniformity thus producing a loose, soft mass of fibers.

By "absorbent fluff" is meant any absorbent matrix which has been prepared by disintegration and mechanically working absorbent composite and base fluffing material in accordance with those methods disclosed in U.S. patent application Ser. No. 319,538; filed Nov. 9, 1981, now U.S. Pat. No. 4,424,247.

By "base fluffing material" is meant a compacted mass of fibrous material which, when mechanically worked, is capable of forming a loose, soft mass of fibers herein defined as fluff.

Suitable hydrophilic absorbent composites which may be used in accordance with the practice of this invention include all absorbent composites containing polymeric absorbents whereby the absorbent film, powder, print or saturation is adhered to one or more layers of wicking substrates such as tissue paper, crepe paper, paper wadding, paper toweling, woven fabrics, nonwoven fiber mats, cellulose fluff, polymeric foams, whether the wicking substrate is attached to one or both sides of the polymeric absorbent. Especially well adapted are those composites disclosed in U.S. Pat. Nos. 4,117,184; 4,176,667; and 4,293,609.

Absorbent film laminates useful in the practice of this invention generally contain a layer of lightly crosslinked hydrophilic polymer film which has been placed on one or between two or more layers of wicking substrates.

The water-swellable or lightly crosslinked hydrophilic polymers useful in this invention can be any of the known hydrophilic polymers that can be constructed in a composite of polymeric absorbent and fibrous absorbent. Examples of such polymers are disclosed in U.S. Pat. Nos. 3,997,484; 3,926,891; 3,395,099; 4,090,013; 4,190,562; and 4,405,387. In addition, examples of film laminates which incorporate the lightly crosslinked polymers of the above described examples are found in U.S. Pat. Nos. 4,117,184; 4,176,677; 4,293,609 and the aforementioned U.S. patent application Ser. No. 319,538.

The preferred hydrophilic polymers useful in this invention are polyelectrolytes exemplary of which are ammonium or alkali metal salts of homopolymers of acrylic or methacrylic acid and copolymers with one or more ethylenically unsaturated comonomers.

Examples of suitable monomers, polymers, crosslinking agents, etc. are dislosed in U.S. patent application Ser. No. 319,538, which is incorporated herein by reference. Also disclosed therein are methods for preparing composites and fluff materials. The fibrous fluff used in this invention can also be pelletized prior to use in the process of this invention using a device such as a commercially available Filamaxx FX-10.

Also useful in the process of this invention are polymers comprising sulfonate monomers which can be used in place of or in addition to the acrylate monomers.

Examples of suitable water-soluble, ethylenically unsaturated sulfonate monomers include N-sulfoalkyl, $\alpha,\beta$-ethylenically unsaturated amide salts such as the alkali metal salts of 2-acrylamido-2-methylpropane sulfonic acid, 2-acrylamido propane sulfonic acid, 2-acrylamido ethane sulfonic acid as well as other such monomers listed in U.S. Pat. No. 3,692,673 which is hereby incorporated by reference alkali metal salts of sulfoalkyl esters of unsaturated carboxylic acids such as 2-sulfoethyl methacrylate and other such sulfoalkyl esters as listed in U.S. Pat. No. 4,075,134 which is also incorporated by reference; salts of sulfoarylalkenes such as vinylbenzyl sulfonic acid and the various salts of vinylbenzyl sulfonate, p-styrene sulfonic acid, salts of sulfoalkenes such as vinyl sulfonic acid, and the like. Of the foregoing sulfonate monomers, the sulfoalkyl derivatives of acrylamide and methacrylamide are preferred with those of acrylamide being especially preferred, particularly the sodium and potassium salts of 2-acrylamido-2-methylpropane sulfonic acid (AMPS), and 2-acrylamido-2-propane sulfonic acid. In the most preferred embodiments, the sulfo group is in the form of an alkali metal sulfonate such as sodium sulfonate.

It is desirable that absorbent fibrous mass or fluff be introduced to the locus of lost circulation through an opening in the borehole wall adjacent to the void in the formation. Preferably, the absorbent material is introduced via an inert liquid carrier such as polyglycols, hydrocarbons such as kerosene or naphtha, monohydroxy alcohols, and the like. It is most desirable that the absorbent material be introduced via such liquids in order that the composite material not swell until it is wet with water.

The concentration of the fibrous mass in the inert liquid carrier can vary. Preferably, about 20 to about 50 pounds of absorbent mass are employed per barrel of drilling mud.

The method of inhibiting lost circulation involves stopping drilling and removing the bit from the hole. The absorbent fibrous mass is then introduced via the inert carrier in an amount necessary to provide sufficient final volume of swellable composition to plug the troublesome opening. A spacer or wiper plug is then introduced into the hole, followed by an increase in pressure to force the absorbent into the troublesome opening in the borehole wall. The material so in place is believed to swell and form a seal within a period of time ranging from a few minutes to about one hour. Drilling can then be resumed.

The following examples are presented to further illustrate, but not limit the scope of this invention.

EXAMPLE 1

Preparation of Fluff Material

A sandwich of tissue-absorbent is prepared according to the procedure of Example 9 in U.S. Pat. No. 4,117,184. This composite structure is then subjected to calendering as described in U.S. Pat. No. 4,293,609 and U.S. patent application Ser. No. 319,538, filed Nov. 9, 1981. The calendered composite has a relatively slow absorbing rate and good absorbent capacity. The composite is divided into small sections about $3 \times 3$ inches and placed into the container of a Waring blender. The composite is ground for 10 seconds at high speed which results in the composite being separated into a low density high bulk product resembling cellulose fluff pulp. The ground or fluffed composite shows a high absorption rate and absorption capacity.

Use of Fluff Material

About 25 pounds of the fluff material, described above, is dispersed in a barrel of kerosene and introduced into a borehole using techniques known in the art. The borehole is then flushed with water. After about 15 minutes drilling can be resumed.

What is claimed is:

1. In a well drilling method wherein a drilling fluid is injected into a borehole in the earth during the drilling of the borehole, the improvement which comprises injecting as the drilling fluid a fluid medium containing a fibrous mass which is a hydrophilic absorbent composite comprising (1) a fibrous absorbent which is a wicking substrate and (2) a water-swellable hydrophilic polymer absorbent, which fibrous mass is employed in an amount sufficient to reduce the loss of the drilling fluid via penetration of the porous subterranean structure or formation openings proximate to the borehole, wherein the fibrous mass when wetted with water forms an essentially fluid-tight plug.

2. A method of claim 1 wherein said fibrous mass is a fibrous fluff.

3. A method of claim 1 wherein said fibrous mass is employed in an amount from about 20 to 50 pounds of fibrous per barrel of drilling mud.

4. A method of claim 3 wherein said fibrous mass is a fibrous fluff.

* * * * *